US009541317B2

(12) United States Patent
Yokohara et al.

(10) Patent No.: US 9,541,317 B2
(45) Date of Patent: Jan. 10, 2017

(54) CONTAINER REFRIGERATION SYSTEM

(75) Inventors: Kazuma Yokohara, Osaka (JP);
Yuusuke Fujimoto, Osaka (JP);
Atsushi Okamoto, Osaka (JP)

(73) Assignee: DAIKIN INDUSTRIES, LTD, Osaka (JP)

( * ) Notice: Subject to any disclaimer, the term of this patent is extended or adjusted under 35 U.S.C. 154(b) by 336 days.

(21) Appl. No.: 13/511,887

(22) PCT Filed: Sep. 10, 2010

(86) PCT No.: PCT/JP2010/005560
§ 371 (c)(1),
(2), (4) Date: May 24, 2012

(87) PCT Pub. No.: WO2011/064928
PCT Pub. Date: Jun. 3, 2011

(65) Prior Publication Data
US 2012/0266621 A1 Oct. 25, 2012

(30) Foreign Application Priority Data

Nov. 25, 2009 (JP) .................. 2009-268030

(51) Int. Cl.
*F25D 21/06* (2006.01)
*F25B 47/02* (2006.01)

(52) U.S. Cl.
CPC ...... *F25B 47/022* (2013.01); *F25B 2400/0403* (2013.01); *F25B 2400/0411* (2013.01);
(Continued)

(58) Field of Classification Search
CPC ............ F25B 1/00; F25B 40/00; F25B 39/00; F25B 41/062; F25B 2700/171; F25B 2700/172; F25B 2700/173; F25B 2700/21175; F25B 2313/0293; F25B 2313/0294; F25B 2600/02; F25B 2600/25; F25B 2600/111; F25B 2600/112; F25B 2600/0253; F25B 2600/2501; F25B 2600/2513; F25B 2600/2515; F25B 47/022; F25B 2700/21161; F25B 2400/16; F25B 2700/1933; F25B 2700/21171; F25B 2400/0403; F25B 2400/0411; F25B 2400/13; F25B 2700/1931
(Continued)

(56) References Cited

U.S. PATENT DOCUMENTS 3,559,422 A * 2/1971 Holzer ........................... 62/209
4,993,233 A * 2/1991 Borton et al. .................. 62/155
(Continued)

FOREIGN PATENT DOCUMENTS

EP 1923646 A1 * 5/2008
JP 52-164737 12/1977
(Continued)

OTHER PUBLICATIONS

English machine translation of JP-2001-272144-A dated Oct. 5, 2001.
(Continued)

*Primary Examiner* — Larry Furdge
(74) *Attorney, Agent, or Firm* — Birch, Stewart, Kolasch & Birch, LLP

(57) ABSTRACT

A container refrigeration system includes a refrigerant circuit configured to perform a refrigeration cycle and including a main circuit in which a compressor, a condenser, an expansion valve, and an evaporator are connected together in this order, and a hot gas bypass circuit in which compressed refrigerant of the compressor is supplied to the evaporator by bypassing the condenser and the expansion valve; and a compressor control section configured to, in a
(Continued)

defrosting operation in which the compressed refrigerant of the compressor returns to the compressor through the hot gas bypass circuit and the evaporator and the evaporator is defrosted, control an operating speed of the compressor such that a pressure of the compressed refrigerant of the compressor reaches a target value.

4 Claims, 10 Drawing Sheets

(52) U.S. Cl.
CPC ....... *F25B 2400/13* (2013.01); *F25B 2400/16* (2013.01); *F25B 2600/111* (2013.01); *F25B 2600/112* (2013.01); *F25B 2700/1931* (2013.01); *F25B 2700/1933* (2013.01); *F25B 2700/21161* (2013.01); *F25B 2700/21171* (2013.01); *Y02B 30/743* (2013.01)

(58) Field of Classification Search
USPC .......................................................... 62/151
See application file for complete search history.

(56) References Cited

U.S. PATENT DOCUMENTS

| | | | |
|---|---|---|---|
| 5,197,297 A | * | 3/1993 | Brendel et al. .................... 62/81 |
| 5,201,185 A | * | 4/1993 | Hanson et al. .................... 62/81 |
| 5,257,506 A | * | 11/1993 | DeWolf ................ F25D 21/006 62/155 |
| 6,058,728 A | * | 5/2000 | Takano et al. ................ 62/196.4 |
| 6,332,496 B1 | * | 12/2001 | Takano et al. ................ 165/202 |
| 2008/0184715 A1 | * | 8/2008 | Chen et al. ........................ 62/81 |

FOREIGN PATENT DOCUMENTS

| | | | |
|---|---|---|---|
| JP | 61-168771 A | | 7/1986 |
| JP | 63-140277 A | | 6/1988 |
| JP | 1-239356 A | | 9/1989 |
| JP | 1-296066 A | | 11/1989 |
| JP | 4-306469 A | | 10/1992 |
| JP | 7-218053 A | | 8/1995 |
| JP | 9-96475 A | | 4/1997 |
| JP | 11-63744 A | | 3/1999 |
| JP | 2001-272144 A | | 10/2001 |
| JP | 2002054578 A | * | 2/2002 |
| JP | 2007-225155 A | | 9/2007 |
| JP | 2008-215645 A | | 9/2008 |
| JP | 2009-109110 A | | 5/2009 |

OTHER PUBLICATIONS

English machine translation of JP-2007-225155-A dated Sep. 6, 2007.

* cited by examiner

US 9,541,317 B2

CONTAINER REFRIGERATION SYSTEM

TECHNICAL FIELD

The present invention relates to a container refrigeration system, and particularly relates to improvement of reliability in hot gas defrosting.

BACKGROUND ART

A container refrigeration system configured to cool an inside of a container has been known as a refrigeration system configured to perform a refrigeration cycle. Patent Document 1 discloses the container refrigeration system of this type.

The container refrigeration system disclosed in Patent Document 1 includes a refrigerant circuit in which a compressor, a condenser, an expansion valve, and an evaporator are connected together. The evaporator is provided inside the container. In the evaporator, refrigerant is evaporated by absorbing heat from air inside the container. In such a manner, the air inside the container is cooled.

In the refrigerant circuit of the container refrigeration system, a bypass circuit configured to supply refrigerant (so-called "hot gas") compressed in the compressor to the evaporator without passing through the condenser is provided. Specifically, the bypass circuit includes two bypass pipes and two opening/closing valves provided respectively for the bypass pipes. Each of the bypass pipes allows communication of a gas line between the compressor and the condenser with a liquid line between the expansion valve and the evaporator. In the container refrigeration system, the foregoing bypass circuit is used to perform a defrosting mode for defrosting the evaporator.

Specifically, in the defrosting mode, a defrosting capacity is adjusted to two levels depending on an opening/closing state of the two opening/closing valves. That is, when only one of the opening/closing valves is opened in the defrosting mode, hot gas is supplied to the evaporator only through corresponding one of the bypass pipes. Thus, the flow rate of refrigerant flowing through the evaporator is relatively low. A heating capacity (defrosting capacity) inside the container is also relatively low. On the other hand, when both of the opening/closing valves are opened in the defrosting mode, hot gas is supplied to the evaporator through the two bypass pipes. Thus, the flow rate of refrigerant flowing through the evaporator is relatively high. The heating capacity (defrosting capacity) inside the container is also relatively high.

CITATION LIST

Patent Document

PATENT DOCUMENT 1: Japanese Patent Publication No. 2008-215645

SUMMARY OF THE INVENTION

Technical Problem

As described above, in the container refrigeration system disclosed in Patent Document 1, the opening/closing state of the two opening/closing valves is switched to adjust the heating capacity inside the container in a heating operation. However, in the defrosting mode, complexity and a cost increase of the refrigerant circuit are caused due to the configuration in which the two opening/closing valves are used. In addition, the heating capacity cannot be finely adjusted only by adjusting the bypass flow rate in association with the switching of the opening/closing state of the two opening/closing valves. Thus, the following disadvantages are caused: air inside the container cannot be quickly heated to a target temperature due to lack of the heating capacity; and energy saving properties are degraded due to excess of the heating capacity.

The present invention has been made in view of the foregoing, and it is an objective of the present invention to provide a highly-reliable container refrigeration system in which a heating capacity is efficiently adjusted in a defrosting mode using a hot gas bypass circuit.

Solution to the Problem

A first aspect of the invention is intended for a container refrigeration system includes a refrigerant circuit (20) configured to perform a refrigeration cycle and including a main circuit (21) in which a compressor (30), a condenser (31), an expansion valve (32), and an evaporator (33) are connected together in this order, and a hot gas bypass circuit (22) in which compressed refrigerant of the compressor (30) is supplied to the evaporator (33) by bypassing the condenser (31) and the expansion valve (32); and a compressor control section (81) configured to, in a defrosting operation in which the compressed refrigerant of the compressor (30) returns to the compressor (30) through the hot gas bypass circuit (22) and the evaporator (33) and the evaporator (33) is defrosted, control an operating speed of the compressor (30) such that a pressure of the compressed refrigerant of the compressor (30) reaches a target value.

In the first aspect of the invention, high-temperature compressed refrigerant of the compressor (30) flows into the evaporator (33) by bypassing the condenser (31) and the main expansion valve (32), thereby defrosting the evaporator (33). The operating speed of the compressor (30) is controlled such that the pressure of the compressed refrigerant of the compressor (30) reaches the target value, i.e., a pressure equivalent saturation temperature of the compressed refrigerant reaches a target value. For example, if the pressure of the compressed refrigerant is lower than the target value, the operating speed of the compressor (30) is high. If the pressure of the compressed refrigerant is higher than the target value, the operating speed of the compressor (30) is low.

A second aspect of the invention is intended for the container refrigeration system of the first aspect of the invention, which further includes a refrigerant amount control section (82) configured to, depending on a superheating degree SH of the compressed refrigerant of the compressor (30) in the defrosting operation, perform a refrigerant discharge operation in which part of the compressed refrigerant of the compressor (30) flows into a high-pressure liquid pipe (25) of the refrigerant circuit (20) in which the condenser (31) is provided, and is stored in the high-pressure liquid pipe (25), and a refrigerant supply operation in which the refrigerant of the high-pressure liquid pipe (25) is supplied to the compressor (30).

In the second aspect of the invention, if the superheating degree SH of the compressed refrigerant is lower than a predetermined value, the refrigerant discharge operation is performed. This allows a decrease in amount of refrigerant circulating between the compressor (30) and the evaporator (33), thereby increasing the superheating degree SH of the compressed refrigerant. If the superheating degree SH of the compressed refrigerant is higher than the predetermined value, the refrigerant supply operation is performed. This allows an increase in amount of refrigerant circulating between the compressor (30) and the evaporator (33), thereby decreasing the superheating degree SH of the compressed refrigerant.

A third aspect of the invention is intended for the container refrigeration system of the second aspect of the invention, which further includes a supercooling heat exchanger (44) provided in the high-pressure liquid pipe (25); and a supercooling branch pipe (26) through which refrigerant branched from the high-pressure liquid pipe (25) supercools liquid refrigerant of the high-pressure liquid pipe (25) in the supercooling heat exchanger (44) and then flows into a low pressure gas pipe (28) of the refrigerant circuit (20) or a compression chamber of the compressor (30) in an intermediate pressure state. In the refrigerant supply operation, the valve control section (82) allows the refrigerant of the high-pressure liquid pipe (25) to flow into the compressor (30) through the supercooling branch pipe (26).

In the third aspect of the invention, in the refrigerant supply operation, refrigerant stored in the condenser (31) and the high-pressure liquid pipe (25) flows into the compressor (30) through the supercooling branch pipe (26), thereby increasing the amount of refrigerant circulating between the compressor (30) and the evaporator (33).

A fourth aspect of the invention is intended for the container refrigeration system of the second or third aspect of the invention, which further includes a fan control section (83) configured to, in the refrigerant discharge operation by the refrigerant amount control section (82), operate a condenser fan (35) of the condenser (31).

In the fourth aspect of the invention, in the refrigerant discharge operation, air is sent to the condenser (31) by the outside-container fan (35). Part of the compressed refrigerant of the compressor (30) flows through the condenser (31), and is condensed by exchanging heat with the air sent by the outside-container fan (35).

A fifth aspect of the invention is intended for the container refrigeration system of the second or third aspect of the invention, in which, in the defrosting operation, when an outlet refrigerant temperature of the evaporator (33) reaches equal to or higher than a predetermined value, the target value for the pressure of the compressed refrigerant of the compressor (30) is changed to a higher value.

In the fifth aspect of the invention, in the defrosting operation, if the outlet refrigerant temperature of the evaporator (33) reaches equal to or higher than the predetermined value, such a state is regarded as the state in which most of frost on the evaporator (33) is melted, and therefore the target value for the pressure of the compressed refrigerant is changed to a higher value. Thus, the evaporator (33) is heated by higher-temperature refrigerant.

A sixth aspect of the invention is intended for the container refrigeration system of any one of the first to fifth aspects of the invention, in which, in a cooling mode in which refrigerant circulates through the main circuit (21) to perform the refrigeration cycle and an inside of a container is cooled, the defrosting operation is started after a predetermined time has elapsed from a start of the cooling mode in a state in which a difference between a temperature inside the container and a set temperature inside the container is equal to or greater than a predetermined value, and the defrosting operation is started after a predetermined time has elapsed from the start of the cooling mode and a cooling capacity of the evaporator (33) is reduced to equal to or less than a predetermined value in a state in which the difference between the temperature inside the container and the set temperature inside the container is less than the predetermined value.

If the difference between the temperature inside the container and the set temperature inside the container is large (an out-range state) even after the cooling mode is performed to some extent, it is assumed that the cooling capacity of the evaporator (33) is not fully used, and that a certain amount of frost is formed on the evaporator (33). Thus, in the out-range state, the defrosting operation is started under the condition where the predetermined time has elapsed from the start of the cooling mode. On the other hand, if the cooling mode is performed to some extent and the difference between the temperature inside the container and the set temperature inside the container is small (an in-range state), it is assumed that the cooling capacity of the evaporator (33) is properly used, and that not so much frost is formed on the evaporator (33). If the defrosting operation is started only under the condition where the predetermined time has elapsed from the start of the cooling mode, it is highly likely that the defrosting operation is actually performed in the state in which not so much frost is formed on the evaporator (33). Thus, in the sixth aspect of the invention, in the in-range state, the defrosting operation is started under the condition where the cooling capacity of the evaporator (33) is reduced to some extent, in addition to the condition where the predetermined time has elapsed from the start of the cooling mode. This prevents the defrosting operation from being uselessly performed.

Advantages of the Invention

As described above, according to the present invention, the operating speed of the compressor (30) is controlled such that the pressure of the compressed refrigerant reaches the target value in the defrosting operation (defrosting mode). Thus, a heating capacity can be quickly adjusted to a suitable heating capacity. As a result, a defrosting mode time can be shortened, and a highly-reliable container refrigeration system (10) can be provided.

According to the second aspect of the invention, the amount of refrigerant circulating between the compressor (30) and the evaporator (33) is adjusted depending on the superheating degree SH of discharged refrigerant. Specifically, when the superheating degree SH is low, part of refrigerant circulating between the compressor (30) and the evaporator (33) is discharged to the high-pressure liquid pipe (25), thereby decreasing the circulating refrigerant amount to increase the superheating degree SH. This prevents refrigerant from being in a moist state in the compressor (30) (i.e., prevents liquid compression in the compressor (30)). On the other hand, when the superheating degree SH is high, refrigerant of the high-pressure liquid pipe (25) is supplied to make up for deficiency of refrigerant circulating between the compressor (30) and the evaporator (33), thereby increasing the circulating refrigerant amount to decrease the superheating degree SH. This prevents an abnormal increase in outlet temperature of the compressor (30), thereby protecting the compressor (30).

According to the fourth aspect of the invention, in the refrigerant discharge operation, the outside-container fan (35) is operated. Thus, it is encouraged that part of the compressed refrigerant discharged to the condenser (31) is condensed into liquid refrigerant. This allows a large amount of refrigerant to be stored in the condenser (31) or the high-pressure liquid pipe (25), and therefore it can be ensured that the refrigerant discharge operation is smoothly performed.

According to the fifth aspect of the invention, when the outlet refrigerant temperature of the evaporator (33) reaches equal to or higher than the predetermined value in the defrosting mode, the target value for the pressure of the compressed refrigerant is changed to a higher value. Thus, after frost adhered to the evaporator (33) is melted, frost adhered to, e.g., a fan and air path walls arranged around the evaporator (33) can be melted at once at a high temperature. As a result, the defrosting mode time can be further shortened.

According to the sixth aspect of the invention, in the state in which the difference between the temperature inside the container and the set temperature inside the container is small, the defrosting mode is started under the condition where the cooling capacity of the evaporator (33) is reduced to equal to or less than the predetermined value, in addition to the condition where the predetermined time has elapsed from the start of the cooling mode. This prevents the defrosting mode from being started even in the state in which no so much frost is actually formed on the evaporator (33). Thus, since the useless defrosting mode can be prevented, the temperature inside the container can be more properly stabilized.

DESCRIPTION OF EMBODIMENTS

An embodiment of the present invention will be described below in detail with reference to drawings. Note that the following embodiment and variations will be set forth merely for purposes of preferred examples in nature, and are not intended to limit the scope, applications, and use of the invention.

A container refrigeration system (10) of the present embodiment is configured to cool an inside of a container which is not shown in the figure. The container refrigeration system (10) also serves as a lid for closing a side opening of a container body.

Figure 1:
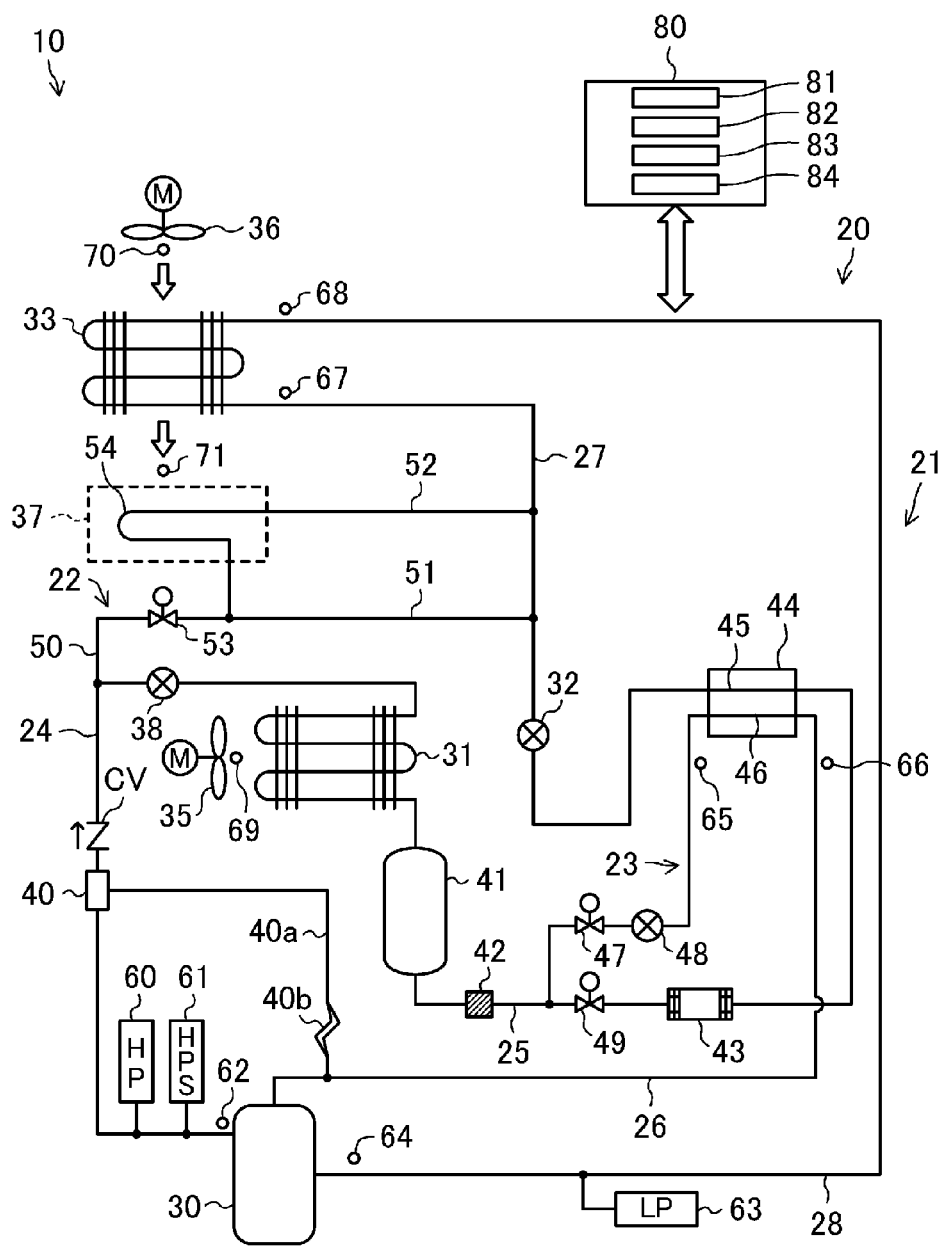
FIG. 1 is a piping diagram of a container refrigeration system of an embodiment.

As illustrated in FIG. 1, the container refrigeration system (10) includes a refrigerant circuit (20) in which refrigerant circulates to perform a refrigeration cycle. The refrigerant circuit (20) includes a main circuit (21), a hot gas bypass circuit (22), and a supercooling circuit (23).

The main circuit (21) is configured such that a compressor (30), a condenser (31), a main expansion valve (32), and an evaporator (33) are connected together in series through refrigerant pipes.

The compressor (30) includes a motor (not shown in the figure) configured to drive a compression mechanism. The rotational speed of the motor of the compressor (30) is controlled at multiple levels by an inverter. That is, the compressor (30) is configured such that the operating speed thereof is variable. The condenser (31) and the evaporator (33) are fin-and-tube heat exchangers. The condenser (31) is arranged outside the container. An outside-container fan (condenser fan) (35) is provided near the condenser (31). In the condenser (31), heat is exchanged between air outside the container and refrigerant. The evaporator (33) is arranged inside the container. An in-container fan (evaporator fan) (36) is provided near the evaporator (33). In the evaporator (33), heat is exchanged between air inside the container and refrigerant. A drain pan (37) is provided below the evaporator (33). The drain pan (37) is formed in a flat container shape opening at an upper end thereof. Frost and ice blocks dropped from the evaporator (33), dew condensation water of air, etc. are collected into the drain pan (37). The main expansion valve (32) is configured such that the opening degree thereof is adjustable to multiple levels by a pulse motor.

An oil separator (40), a check valve (CV), and a pressure adjusting valve (38) are provided in this order in a high-pressure gas pipe (24) between the compressor (30) and the condenser (31). An oil return pipe (40a) of the oil separator (40) is connected to the supercooling circuit (23). A capillary tube (40b) is provided in the oil return pipe (40a). The check valve (CV) allows refrigerant to flow in a direction indicated by an arrow illustrated in FIG. 1, and prevents refrigerant from flowing in an opposite direction. The pressure adjusting valve (38) is configured such that the opening degree thereof is adjustable to multiple levels by a pulse motor.

A receiver (41), a cooling member (42), a drier (43), a second opening/closing valve (49), and a supercooling heat exchanger (44) are provided in this order in a high-pressure liquid pipe (25) between the condenser (31) and the main expansion valve (32). A refrigerant flow path is formed in the cooling member (42), and an outer part of the cooling member (42) contacts a power element of an inverter circuit (not shown in the figure). That is, the cooling member (42) is configured to cool the power element by refrigerant. The second opening/closing valve (49) is an openable solenoid valve. The drier (43) is configured to trap moisture in liquid refrigerant flowing out from the condenser (31).

The supercooling heat exchanger (44) is configured to cool liquid refrigerant flowing out from the condenser (31). The supercooling heat exchanger (44) includes a primary path (45) and a secondary path (46). That is, in the supercooling heat exchanger (44), heat is exchanged between refrigerant flowing through the primary path (45) and refrigerant flowing through the secondary path (46). The primary path (45) is connected to the high-pressure liquid pipe (25) of the main circuit (21), and the secondary path (46) is connected to a supercooling branch pipe (26) of the supercooling circuit (23). An inlet end of the supercooling branch pipe (26) is connected to the high-pressure liquid pipe (25) between the cooling member (42) and the second opening/closing valve (49). An outlet end of the supercooling branch pipe (26) is connected to a compression chamber (intermediate compression chamber) of the compressor (30) in the middle of compression (intermediate pressure state). That is, the supercooling branch pipe (26) is a path in which part of liquid refrigerant of the high-pressure liquid pipe (25) is branched and flows into the intermediate compression chamber of the compressor (30). A first opening/closing valve (47) and a supercooling expansion valve (48) are provided in the supercooling branch pipe (26) on an inlet side of the secondary path (46). The first opening/closing valve (47) is an openable solenoid valve. The supercooling expansion valve (48) is configured such that the opening degree thereof is adjustable to multiple levels by a pulse motor, and serves as a pressure reduction mechanism configured to reduce the pressure of refrigerant.

The hot gas bypass circuit (22) includes a single main path (50) and two branch paths (51, 52) (the first branch path (51) and the second branch path (52)) branched from the main path (50). An inlet end of the main path (50) is connected to the high-pressure gas pipe (24) between the check valve (CV) and the pressure adjusting valve (38). A third opening/closing valve (53) is provided in the main path (50). The third opening/closing valve (53) is an openable solenoid valve.

One end of the first branch path (51) is connected to an outlet end of the main path (50), and the other end of the first branch path (51) is connected to a low-pressure liquid pipe (27) between the main expansion valve (32) and the evaporator (33). Similarly, one end of the second branch path (52) is connected to the outlet end of the main path (50), and the other end of the second branch path (52) is connected to the low-pressure liquid pipe (27). The second branch path (52) is a refrigerant pipe longer than the first branch path (51). In addition, the second branch path (52) includes a drain pan heater (54) arranged so as to extend in a serpentine shape along a bottom part of the drain pan (37). The drain pan heater (54) is configured to heat an inside of the drain pan (37) by refrigerant. As in the foregoing, the hot gas bypass circuit (22) is a bypass circuit configured to supply refrigerant compressed in the compressor (30) (high-temperature high-pressure gas refrigerant discharged from the compressor (30)) to the evaporator (33).

Various sensors etc. are provided in the refrigerant circuit (20). Specifically, a high pressure sensor (60), a high pressure switch (61), and an outlet temperature sensor (62) are provided in the high-pressure gas pipe (24). The high pressure sensor (60) is configured to detect the pressure of high-pressure gas refrigerant discharged from the compressor (30). The outlet temperature sensor (62) is configured to detect the temperature of high-pressure gas refrigerant discharged from the compressor (30). A low pressure sensor (63) and an inlet temperature sensor (64) are provided in a low pressure gas pipe (28) between the evaporator (33) and the compressor (30). The low pressure sensor (63) is configured to detect the pressure of low-pressure gas refrigerant flowing into the compressor (30). The inlet temperature sensor (64) is configured to detect the temperature of low-pressure gas refrigerant flowing into the compressor (30).

An inlet temperature sensor (65) is provided in the supercooling branch pipe (26) on an inlet side of the secondary path (46), and an outlet temperature sensor (66) is provided in the supercooling branch pipe (26) on an outlet side of the secondary path (46). The inlet temperature sensor (65) is configured to detect the temperature of refrigerant right before the refrigerant flows into the secondary path (46). The outlet temperature sensor (66) is configured to detect the temperature of refrigerant right after the refrigerant flows out from the secondary path (46).

An inlet temperature sensor (67) is provided in the low-pressure liquid pipe (27) on an inlet side of the evaporator (33). The inlet temperature sensor (67) is configured to detect the temperature of refrigerant right before the refrigerant flows into the evaporator (33). An outlet temperature sensor (68) is provided in the low pressure gas pipe (28) on an outlet side of the evaporator (33). The outlet temperature sensor (68) is configured to detect the temperature of refrigerant right after the refrigerant flows out from the evaporator (33).

An outdoor air temperature sensor (69) is provided on an inlet side of the condenser (31) outside the container. The outdoor air temperature sensor (69) is configured to detect the temperature of air outside the container (i.e., an outdoor air temperature) right before the air outside the container flows into the condenser (31). An inlet temperature sensor (70) is provided on the inlet side of the evaporator (33) inside the container, and an outlet temperature sensor (71) is provided on the outlet side of the evaporator (33) inside the container. The inlet temperature sensor (70) is configured to detect the temperature of air inside the container right before the air inside the container passes through the evaporator (33). The outlet temperature sensor (71) is configured to detect the temperature of air inside the container right after the air inside the container passes through the evaporator (33).

A controller (80) which is a control section configured to control the refrigerant circuit (20) is provided in the container refrigeration system (10). The controller (80) includes a compressor control section (81) configured to control the operating speed of the compressor (30), a valve control section (82) configured to control the valves (32, 38, 47, 48, 49, 53), a fan control section (83) configured to control the fans (35, 36), and a refrigerant amount determination section (84) configured to determine a refrigerant amount in a defrosting mode which will be described later. Note that the valve control section (82) serves as a refrigerant amount control section of the present invention.

Modes

Next, modes of the container refrigeration system (10) will be described. The modes of the container refrigeration system fall into two broad categories: a "cooling mode (cooling operation)" and the "defrosting mode (defrosting operation)." The cooling mode is the mode in which the inside of the container is cooled to a relatively-low temperature. That is, the cooling mode is the mode in which the inside of the container is refrigerated/frozen to store transport objects (e.g., fresh food) held in the container body. The defrosting mode is the mode in which frost adhered to, e.g., a surface of a heat transfer pipe of the evaporator is melted. The defrosting mode is performed every time a predetermined set time has elapsed from, e.g., a start of the cooling mode (every time a defrosting timer counts up), and the cooling mode is resumed after termination of the defrosting mode.

<Cooling Mode>

Figure 2:
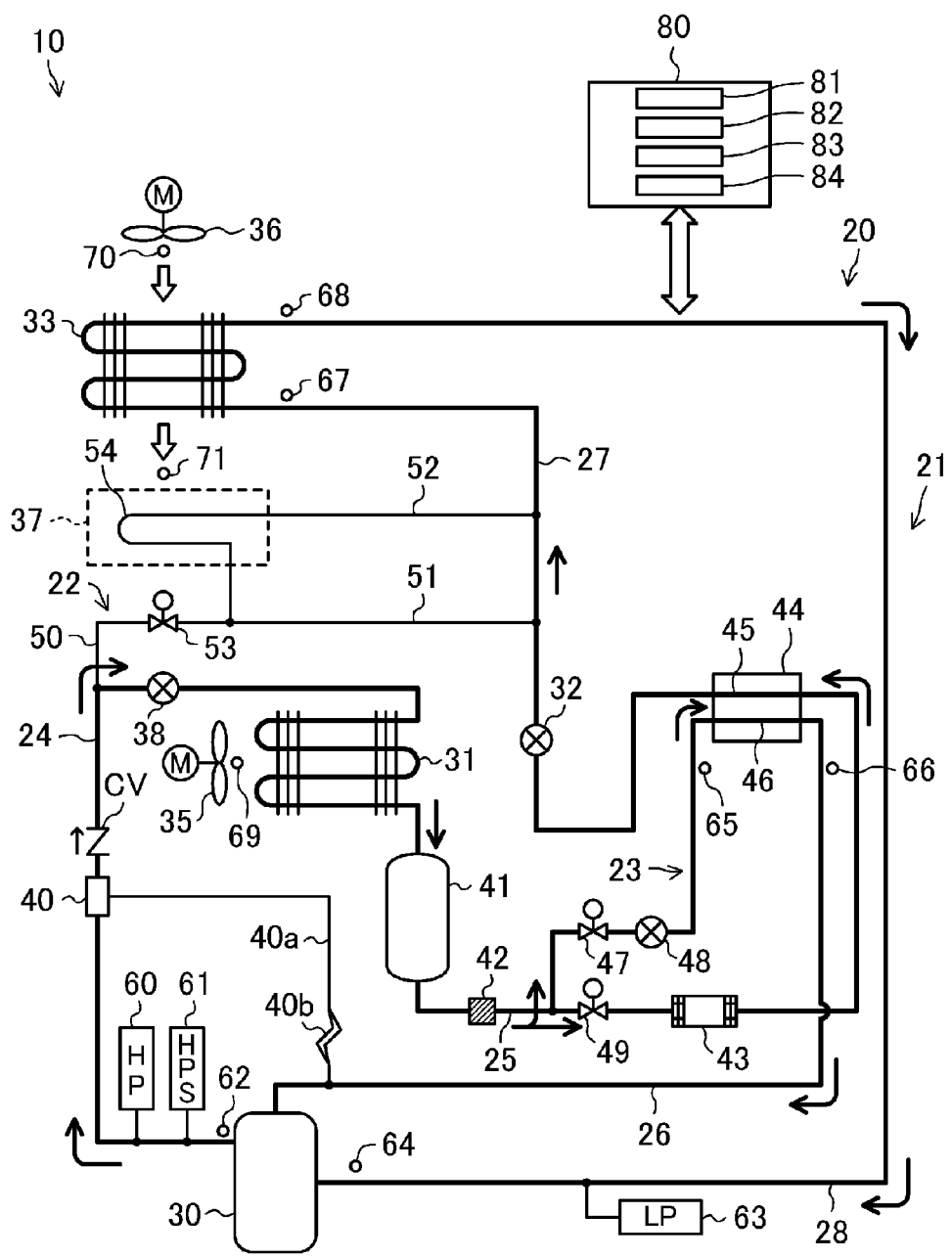
FIG. 2 is a piping diagram illustrating a refrigerant flow in a cooling mode of the embodiment.

In the cooling mode illustrated in FIG. 2, the first opening/closing valve (47) and the second opening/closing valve (49) are in an open state, and the third opening/closing valve (53) is in a closed state. The pressure adjusting valve (38) is in a fully-open state, and the degrees of opening of the supercooling expansion valve (48) and the main expansion valve

(32) are adjusted as necessary. In addition, the compressor (30), the outside-container fan (35), and the in-container fan (36) are in operation.

Refrigerant compressed in the compressor (30) is condensed (dissipates heat) in the condenser (31), and then passes through the receiver (41). After passing through the receiver (41), part of the refrigerant flows through the low-pressure liquid pipe (27), and the remaining part of the refrigerant flows into the supercooling branch pipe (26). The pressure of the refrigerant flowing through the low-pressure liquid pipe (27) is reduced by the main expansion valve (32), and then such refrigerant flows through the evaporator (33). In the evaporator (33), the refrigerant is evaporated by absorbing heat from air inside the container. In such a manner, the air inside the container is cooled. The refrigerant evaporated in the evaporator (33) flows into the compressor (30) and is re-compressed therein.

The pressure of the refrigerant flowing into the supercooling branch pipe (26) is reduced to an intermediate pressure by passing through the supercooling expansion valve (48), and then such refrigerant flows through the secondary path (46) of the supercooling heat exchanger (44). In the supercooling heat exchanger (44), heat is exchanged between refrigerant flowing through the primary path (45) and refrigerant flowing through the secondary path (46). As a result, the refrigerant of the primary path (45) is supercooled, and the refrigerant of the secondary path (46) is evaporated. The refrigerant flowing out from the secondary path (46) flows into the compression chamber of the compressor (30) in an intermediate pressure state through an intermediate port of the compressor (30).

In the cooling mode, the operating speed (operating frequency) of the compressor (30) is controlled by the compressor control section (81). Specifically, the operating speed of the compressor (30) is controlled such that an outlet air temperature SS approaches a target temperature SP. In addition, in the cooling mode, the rotational speed of the outside-container fan (35) is controlled by the fan control section (83). Specifically, the rotational speed of a motor of the outside-container fan (35) is controlled such that a pressure HP of high-pressure refrigerant detected by the high pressure sensor (60) is maintained constant. Further, the fan control section (83) controls the rotational speed of the in-container fan (36) at multiple levels depending on a cooling load inside the container.

In the cooling mode, a so-called "superheating degree control" in association with the degree of opening of the main expansion valve (32) is performed by the valve control section (82). Specifically, the degree of opening of the main expansion valve (32) is controlled such that the superheating degree of low-pressure refrigerant flowing into the compressor (30) approaches a predetermined set value. In addition, in the cooling mode, the superheating degree control in association with the degree of opening of the supercooling expansion valve (48) is also performed by the valve control section (82). Specifically, the degree of opening of the supercooling expansion valve (48) is controlled such that the superheating degree of intermediate-pressure refrigerant flowing out from the secondary path (46) of the supercooling heat exchanger (44) approaches a predetermined set value.

<Defrosting Mode>

When the foregoing cooling mode is continuously performed, frost is adhered to, e.g., the surface of the heat transfer pipe of the evaporator (33), and is gradually deposited in larger quantities. Thus, in the container refrigeration system (10), the defrosting mode for defrosting the evaporator (33) is performed every time the predetermined time has elapsed from the start of the cooling mode (every time the defrosting timer counts up).

Figure 3:
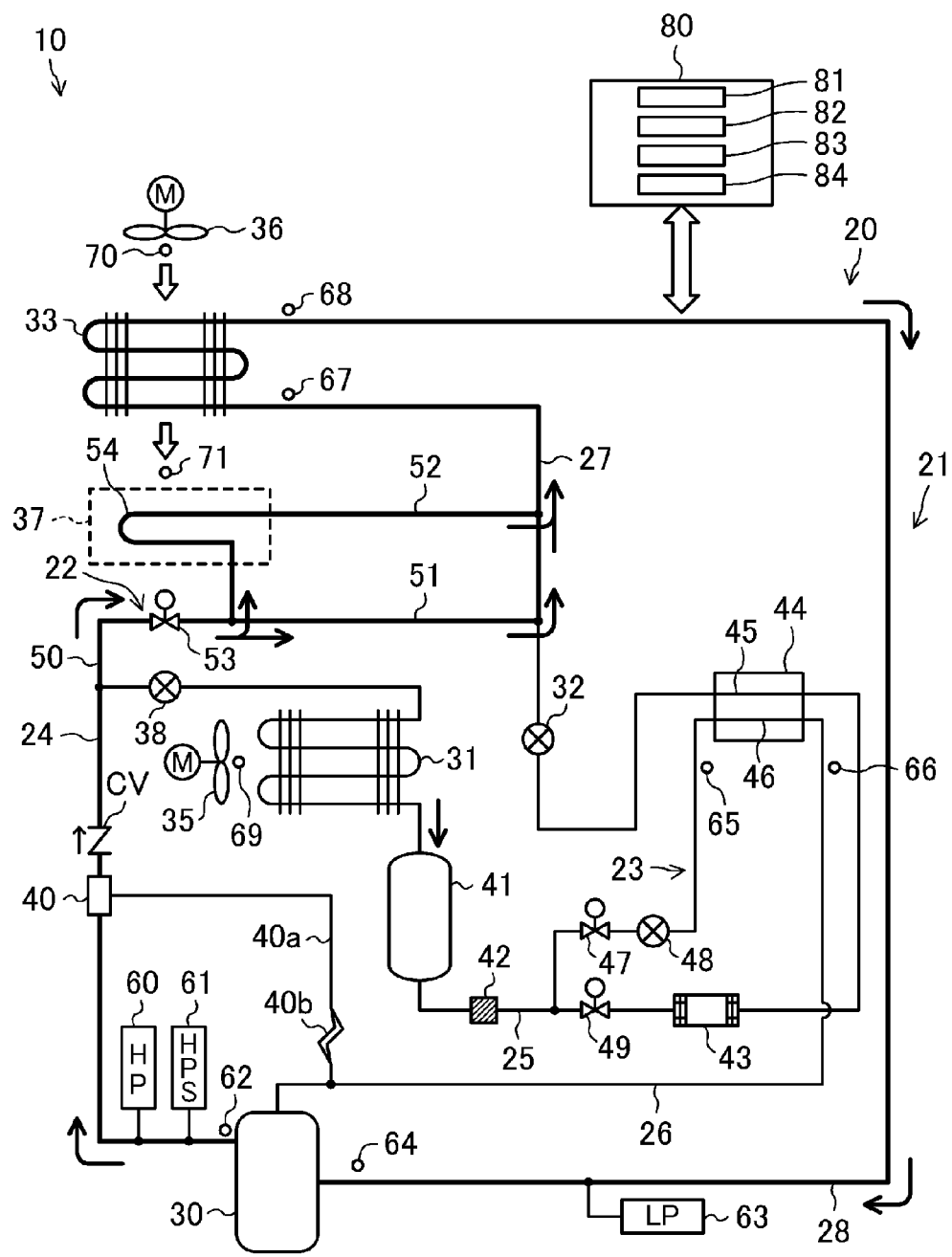
FIG. 3 is a piping diagram illustrating a refrigerant flow in a defrosting mode of the embodiment.

The defrosting mode illustrated in FIG. 3 is the mode in which high-temperature high-pressure gas refrigerant compressed in the compressor (30) is supplied to the evaporator (33) by bypassing the condenser (31), the receiver (41), the supercooling heat exchanger (44), and the main expansion valve (32).

In the defrosting mode, the second opening/closing valve (49) is in the closed state, and the third opening/closing valve (53) is in the open state. The main expansion valve (32) is in a fully-closed state (zero pulse). The first opening/closing valve (47), the pressure adjusting valve (38), and the supercooling expansion valve (48) are, as a general rule, in the fully-closed state (zero pulse). While the compressor (30) is in operation, the outside-container fan (35) and the in-container fan (36) are stopped as a general rule.

Refrigerant compressed in the compressor (30) is supplied to the evaporator (33) through the hot gas bypass circuit (22). Specifically, high-pressure gas refrigerant flows through the main path (50), and then is branched into the first branch path (51) and the second branch path (52). The refrigerant flowing into the second branch path (52) passes through the drain pan heater (54). For example, ice blocks dropped from a surface of the evaporator (33) are collected into the drain pan (37). The ice blocks etc. are heated and melted by the refrigerant flowing through the drain pan heater (54). The melted water is discharged to outside the container through a predetermined flow path.

The refrigerant flowing out from the drain pan heater (54) joins the refrigerant flowing out from the first branch path (51), and then flows through the evaporator (33). In the evaporator (33), high-pressure gas refrigerant (so-called "hot gas") circulates through the heat transfer pipe of the evaporator (33). Thus, frost adhered to the periphery of the heat transfer pipe of the evaporator (33) is gradually heated from an inside of the heat transfer pipe by the refrigerant. As a result, the frost adhered to the evaporator (33) is gradually melted and is dropped from the heat transfer pipe. Then, the frost (ice blocks) dropped from the heat transfer pipe is collected into the drain pan (37). The refrigerant used for defrosting of the evaporator (33) flows into the compressor (30) and is compressed therein.

In the foregoing defrosting mode, the following controls are performed by the control sections (81, 82, 83, 84).

Figure 4:
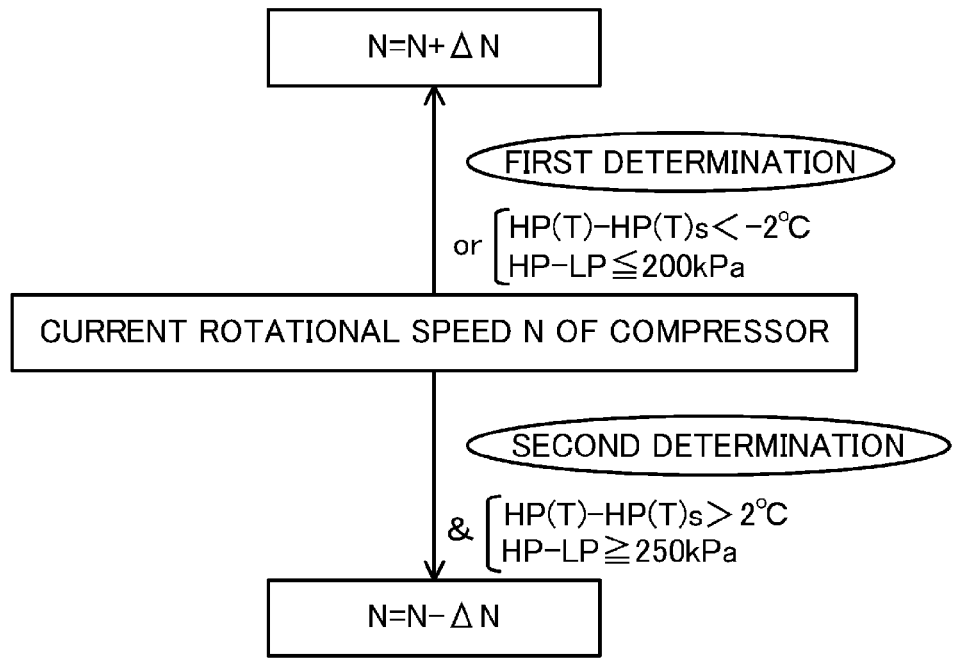
FIG. 4 is a flowchart illustrating a control operation by a compressor control section of the embodiment.

As illustrated in FIG. 4, the operating speed (operating frequency) of the compressor (30) is controlled by the compressor control section (81). Specifically, the compressor control section (81) controls the operating speed of the compressor (30) such that the pressure detected by the high pressure sensor (60) reaches a predetermined value, i.e., a pressure equivalent saturation temperature HP(T) of high-pressure refrigerant reaches the predetermined value. More specifically, the compressor control section (81) increases a current operating speed N of the compressor (30) by a predetermined amount ΔN when conditions of a first determination illustrated in FIG. 4 are satisfied. In the first determination, "HP(T)s" represents a target temperature of the pressure equivalent saturation temperature HP(T). In the present embodiment, if the pressure equivalent saturation temperature HP(T) is lower than the target temperature HP(T)s by a predetermined value (2° C.), such a state is, considering errors, regarded as a lack of the defrosting capacity (heating capacity). Thus, the operating speed of the compressor (30) is increased. This increases the defrosting capacity. In the present embodiment, even if the pressure equivalent saturation temperature HP(T) is not lower than the target temperature HP(T)s by the predetermined value as described above, the operating speed of the compressor (30) is increased when a difference between high and low pressures (high pressure HP–low pressure LP) reaches equal to or less than a predetermined value (200 kPa). This increases the difference between high and low pressures in the compressor (30). Thus, damage of the compressor (30) due to too small difference between high and low pressures can be prevented in advance. The high pressure HP is the pressure of high-pressure refrigerant detected by the high pressure sensor (60), and the low pressure LP is the pressure of low-pressure refrigerant detected by the low pressure sensor (63). If the conditions of the first determination are still satisfied, the operating speed N of the compressor (30) is further increased by the predetermined amount ΔN as in the foregoing. Note that, in the present embodiment, the target temperature HP(T)s is set to 50° C. The temperature of 50° C. is a suitable heating temperature at which frost on the heat transfer pipe is not dropped at once by rapid heating. If conditions of a second determination illustrated in FIG. 4 are satisfied, the compressor control section (81) decreases the current operating speed N of the compressor (30) by the predetermined amount ΔN. Specifically, when the pressure equivalent saturation temperature HP(T) is higher than the target temperature HP(T)s by a predetermined value (2° C.), such a state is regarded as excess of the defrosting capacity (heating capacity), and the operating speed of the compressor (30) is decreased. This reduces the defrosting capacity. It is also a condition of the second determination that the difference between high and low pressures (high pressure HP–low pressure LP) is equal to or greater than a predetermined value (250 kPa). This is because, if the operating speed of the compressor (30) is decreased when the difference between high and low pressures in the compressor (30) is small, the difference between high and low pressures is further decreased, resulting in the damage of the compressor (30). If the conditions of the second determination are still satisfied, the operating speed N of the compressor (30) is further decreased by the predetermined amount ΔN as in the foregoing. As described above, the operating speed of the compressor (30) is controlled such that the pressure equivalent saturation temperature HP(T) is maintained constant (within a predetermined range), thereby properly and quickly adjusting the defrosting capacity.

Figure 5:
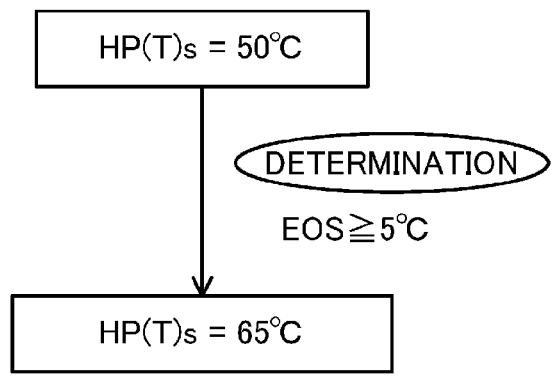
FIG. 5 is a flowchart illustrating steps for changing a target temperature HP(T)s of a pressure equivalent saturation temperature HP(T) of the embodiment.

As illustrated in FIG. 5, in the present embodiment, when the temperature (i.e., an evaporator outlet refrigerant temperature EOS) of refrigerant detected by the outlet temperature sensor (68) in the defrosting mode reaches equal to or higher than a predetermined value (5° C.), the target temperature HP(T)s is changed to a higher value. In the present embodiment, the target temperature HP(T)s is changed from 50° C. to 65° C. This is because, when the evaporator outlet refrigerant temperature EOS reaches equal to or higher than the predetermined value, such a state is regarded as melting most of frost adhered to the evaporator (33), and then frost adhered to, e.g., the in-container fan (36) and air path walls (not shown in the figure) arranged around the evaporator (33) is melted at once at a high temperature. That is, when there is no longer concern over the state in which frost is dropped from the evaporator (33) by rapidly heating the frost at a high temperature, frost on the components around the evaporator (33) is melted for a short period of time.

The refrigerant amount determination section (84) determines excess or deficiency of a refrigerant amount in a refrigerant circulation cycle of the defrosting mode. Depending on the excess or deficiency of the refrigerant amount, the valve control section (82) controls the first opening/closing valve (47), the pressure adjusting valve (38), and the supercooling expansion valve (48), and the fan control section (83) controls the outside-container fan (35).

Figure 6:
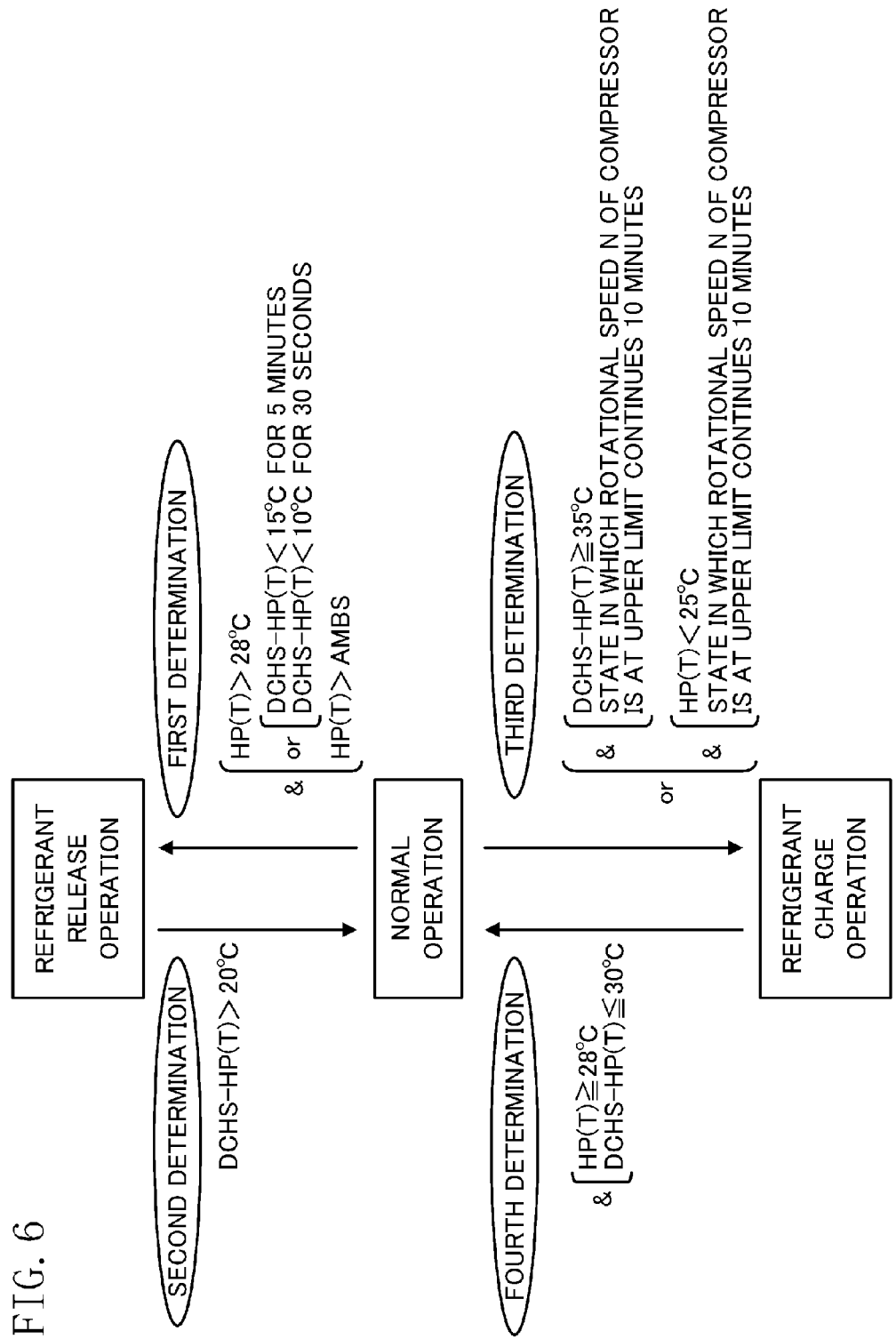
FIG. 6 is a flowchart illustrating a determination operation by a refrigerant amount determination section of the embodiment.
Figure 7:
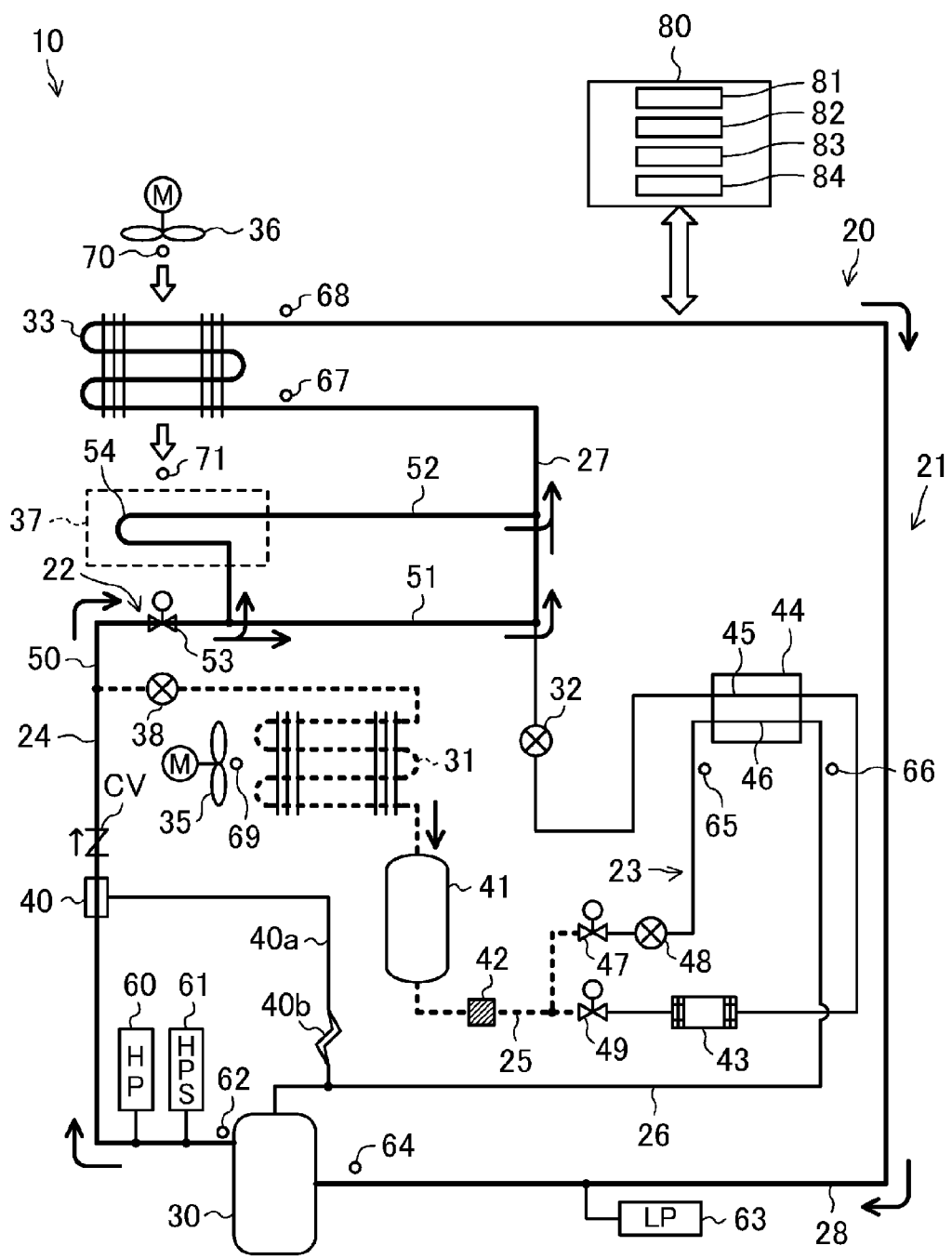
FIG. 7 is a piping diagram illustrating a refrigerant flow in a refrigerant release operation of a heating operation of the embodiment.

Specifically, as illustrated in FIG. 6, a determination operation by the refrigerant amount determination section (84) is performed. In a normal operation (i.e., the defrosting mode illustrated in FIG. 3), when the refrigerant amount determination section (84) determines based on conditions of a first determination illustrated in FIG. 6 that the refrigerant amount is excessive, a refrigerant release operation (refrigerant discharge operation) illustrated in FIG. 7 is performed. In the refrigerant release operation, the pressure adjusting valve (38) is switched to the open state by the valve control section (82), and the outside-container fan (35) is operated at a low speed by the fan control section (83). In the refrigerant release operation, part of high-pressure refrigerant discharged from the compressor (30) is condensed in the condenser (31), and is stored in the receiver (41). Thus, part of refrigerant in the refrigerant circulation cycle of the defrosting mode is released to the high-pressure liquid pipe (25), thereby decreasing the refrigerant amount in the defrosting mode. In addition, part of liquid refrigerant of the receiver (41) flows into the cooling member (42). Thus, the inverter circuit is cooled.

In the conditions of the first determination illustrated in FIG. 6, "HP(T)" represents a pressure equivalent saturation temperature of refrigerant (high-pressure refrigerant) discharged from the compressor (30), "DCHS" represents a temperature detected by the outlet temperature sensor (62), and "AMBS" represents a temperature detected by the outdoor air temperature sensor (69). That is, if the pressure equivalent saturation temperature HP(T) of high-pressure refrigerant is higher than a predetermined value, and a superheating degree SH (DCHS—HP(T)) of discharged refrigerant is less than a predetermined value, there is a possibility that refrigerant discharged from the compressor (30) is in a moist state. Thus, the moist state is prevented by decreasing the refrigerant amount in the refrigerant circulation cycle. In addition, if the pressure equivalent saturation temperature HP(T) is lower than the outdoor temperature AMBS, the pressure in the condenser (31) is higher than the pressure of high-pressure refrigerant. Since refrigerant flows out from the condenser (31) by opening the pressure adjusting valve (38), it is one of the conditions that the pressure equivalent saturation temperature HP(T) is higher than the outdoor temperature AMBS. Under such a condition, it can be ensured that part of refrigerant discharged from the compressor (30) is released toward the condenser (31) in the refrigerant release operation.

In the refrigerant release operation, when the refrigerant amount determination section (84) determines based on conditions of a second determination illustrated in FIG. 6 that the refrigerant amount is proper, the process returns to the normal operation illustrated in FIG. 3. That is, when the superheating degree SH (DCHS—HP(T)) of discharged refrigerant is higher than the predetermined value, such a state is regarded as the state in which it is less likely that refrigerant discharged from the compressor (30) is in the moist state, and therefore the process returns to the normal operation.

Figure 8:
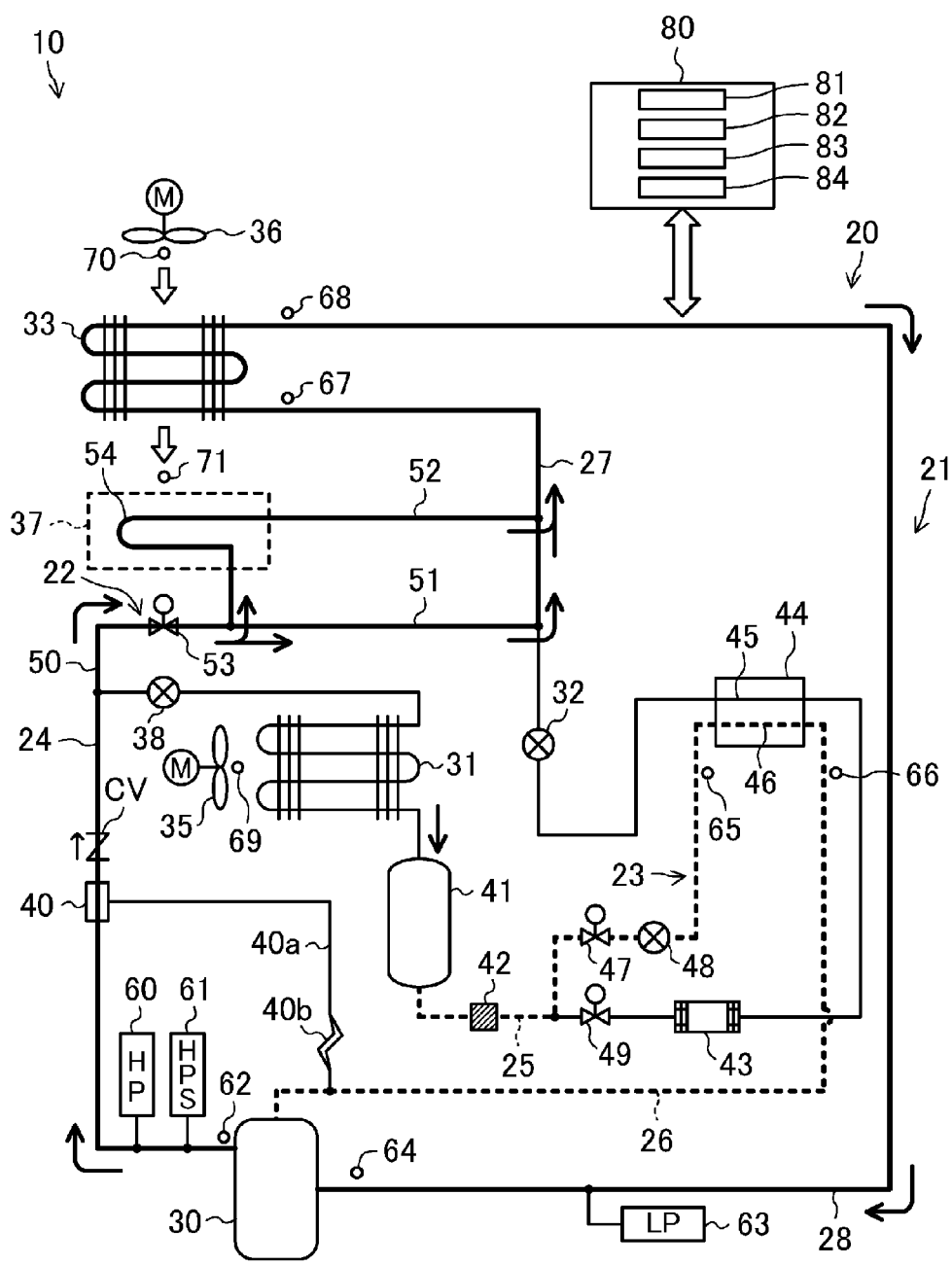
FIG. 8 is a piping diagram illustrating a refrigerant flow in a refrigerant charge operation of the heating operation of the embodiment.

In the normal operation, when the refrigerant amount determination section (84) determines based on conditions of a third determination illustrated in FIG. 6 that the refrigerant amount is deficient, a refrigerant charge operation (refrigerant supply operation) illustrated in FIG. 8 is performed. In the refrigerant charge operation, the first opening/closing valve (47) and the supercooling expansion valve

(48) are switched to the open state by the valve control section (82). Note that, in the refrigerant charge operation, the pressure adjusting valve (38) is in the closed state, and the outside-container fan (35) is stopped. In the refrigerant charge operation, liquid refrigerant of the receiver (41) flows into the compression chamber of the compressor (30) in the intermediate pressure state through the supercooling branch pipe (26). Thus, refrigerant of the high-pressure liquid pipe (25) is charged (supplied) to the refrigerant circulation cycle of the defrosting mode, thereby increasing the refrigerant amount in the defrosting mode. In such a case, since liquid refrigerant of the receiver (41) circulates through the cooling member (42), the inverter circuit is cooled.

In the third determination illustrated in FIG. 6, if the state in which the superheating degree SH (DCHS−HP(T)) of discharged refrigerant is equal to or higher than the predetermined value due to an over-decrease in pressure equivalent saturation temperature HP(T) of high-pressure refrigerant continues for, e.g., 10 minutes, it is determined that the outlet temperature of the compressor (30) is abnormally high. In such a case, the refrigerant amount in the refrigerant circulation cycle is increased to decrease the superheating degree SH of discharged refrigerant, thereby protecting the compressor (30). In addition, in the third determination, it is one of the conditions that the operating speed N of the compressor (30) reaches an upper limit thereof. If there is a margin in the range of the operating speed N of the compressor (30), the operating speed is increased to increase a refrigerant circulation amount, thereby reducing the superheating degree SH of discharged refrigerant. The superheating degree SH can be more quickly changed and be stabilized by increasing the operating speed of the compressor (30) rather than by the foregoing refrigerant charge operation. Thus, if the operating speed N of the compressor (30) reaches the upper limit thereof, i.e., the operating speed N of the compressor (30) can be no longer increased, the superheating degree SH of discharged refrigerant is decreased by the refrigerant charge operation.

In the refrigerant charge operation, if the refrigerant amount determination section (84) determines based on conditions of a fourth determination illustrated in FIG. 6 that the refrigerant amount is proper, the process returns to the normal operation illustrated in FIG. 3. That is, if the pressure equivalent saturation temperature HP(T) of high-pressure refrigerant reaches equal to or higher than a predetermined value, and the superheating degree SH (DCHS—HP(T)) of discharged refrigerant reaches equal to or lower than a predetermined value, such a state is regarded as the state in which the outlet temperature of the compressor (30) is proper, and therefore the process returns to the normal operation.

As described above, in the defrosting mode, the amount of refrigerant circulating between the compressor (30) and the evaporator (33) is increased/decreased such that the superheating degree SH of refrigerant discharged from the compressor (30) reaches the predetermined value (within a target range). That is, when the superheating degree SH is low, part of refrigerant circulating between the compressor (30) and the evaporator (33) is released to the high-pressure liquid pipe (25). On the other hand, when the superheating degree SH is high, refrigerant of the high-pressure liquid pipe (25) is charged to make up for the deficiency of refrigerant circulating between the compressor (30) and the evaporator (33).

Figure 9:
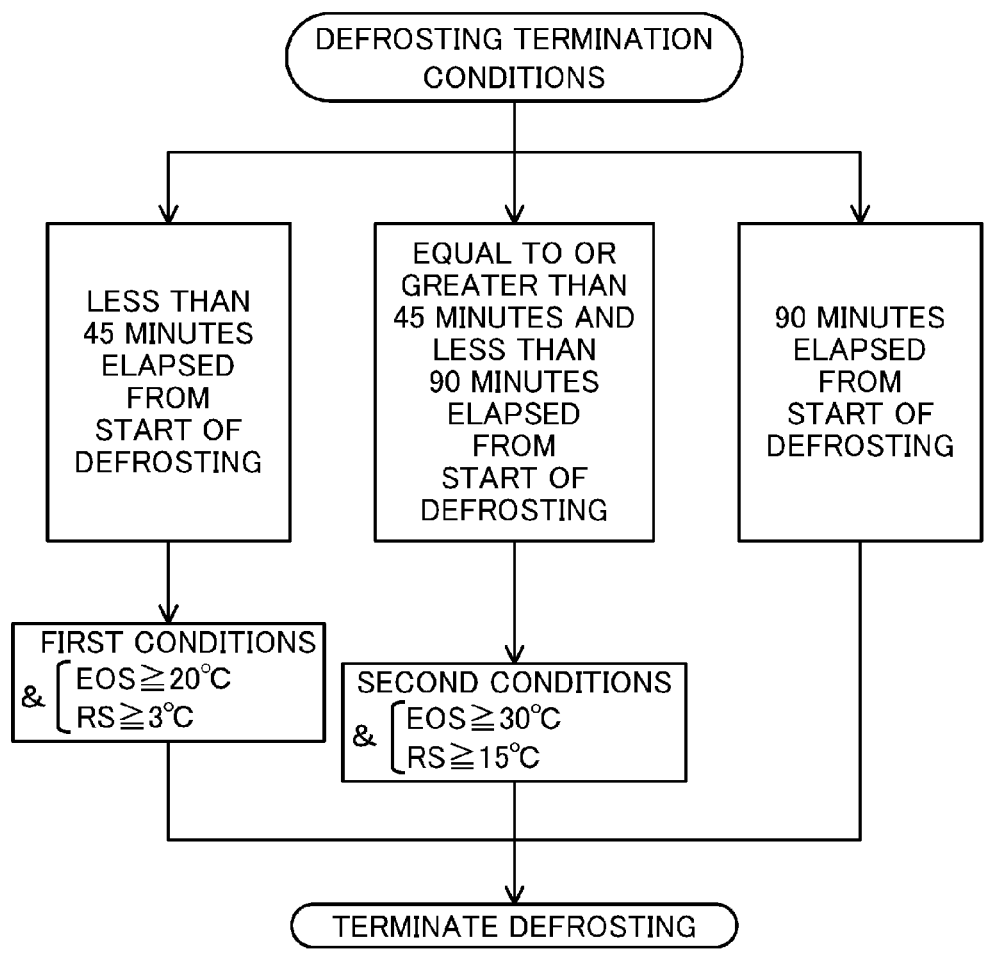
FIG. 9 is a flowchart illustrating termination conditions for the defrosting mode of the embodiment.

Next, termination conditions for the defrosting mode will be described with reference to FIG. 9. In the present embodiment, the termination conditions are different depending on an elapsed time from a start of the defrosting mode (an operation time of the defrosting mode).

First, after the defrosting mode is started and before a first predetermined time (45 minutes) has elapsed, it is determined whether or not first conditions are satisfied. Specifically, the defrosting mode is terminated if in the defrosting mode, the temperature (evaporator outlet refrigerant temperature EOS) of refrigerant detected by the outlet temperature sensor (68) reaches equal to or higher than a predetermined value (20° C.) and the temperature (inlet air temperature RS) of air inside the container detected by the inlet temperature sensor (70) reaches equal to or higher than a predetermined value (3° C.). That is, if the defrosting mode is terminated under the first conditions, the operation time of the defrosting mode is less than 45 minutes. As frost on the evaporator (33) is melted, the evaporator outlet refrigerant temperature EOS is gradually increased. In addition, as frost on the evaporator (33) is melted, the temperature of air flowing into the container through the evaporator (33) is gradually increased, and therefore the temperature (inlet air temperature RS) of air flowing into the evaporator (33) from the container is gradually increased. Thus, an increase in evaporator outlet refrigerant temperature EOS and inlet air temperature RS to a predetermined temperature is regarded as the state in which most of frost on the evaporator (33) is melted, and therefore the defrosting mode is terminated. After the first predetermined time has elapsed from the start of the defrosting mode without satisfying the first conditions and before a second predetermined time (90 minutes) has elapsed, it is determined whether or not second conditions are satisfied. In the second conditions, the predetermined values for the evaporator outlet refrigerant temperature EOS and the inlet air temperature RS are set to larger values (changed from 20° C. to 30° C. and from 3° C. to 15° C.) than those of the first conditions. That is, the defrosting mode is terminated if the evaporator outlet refrigerant temperature EOS reaches equal to or higher than 30° C. and the inlet air temperature RS reaches equal to or higher than 15° C. If the defrosting mode is terminated under the second conditions, the operation time of the defrosting mode is equal to or greater than 45 minutes and less than 90 minutes. If the first conditions are not satisfied until the first predetermined time (45 minutes) has elapsed, such a state is regarded as the state in which the amount of frost on the evaporator (33) is significantly large. In such a case, the predetermined values for the evaporator outlet refrigerant temperature EOS and the inlet air temperature RS are set to larger values. Thus, a longer defrosting mode time can be ensured, and it can be ensured that frost is completely melted. If the cooling mode is performed in the state in which part of frost is not melted, such frost is deposited in larger quantities a short time later, and it is required that the defrosting mode is often performed. However, since frost is completely melted, the foregoing state can be prevented. If the amount of frost is large beyond expectation and the frost is not completely melted, the second predetermined time (90 minutes) may have elapsed without satisfying the second conditions. In such a case, the defrosting mode is forcibly terminated when the second predetermined time has elapsed. Since the defrosting mode is the mode in which hot gas is supplied to the evaporator (33), the temperature inside the container is gradually increased. Thus, when the defrosting mode time reaches the predetermined time, even if part of frost is not melted, the defrosting mode is forcibly terminated to prevent an abnormal increase in temperature inside the container.

Advantages of Embodiment

According to the foregoing embodiment, in the defrosting mode, the operating speed of the compressor (30) is controlled such that the outlet air temperature SS reaches the target temperature SP. Thus, the refrigerant circulation amount can be quickly adjusted depending on the outlet air temperature SS, thereby efficiently adjusting the heating capacity.

In the foregoing embodiment, the amount of refrigerant circulating between the compressor (30) and the evaporator (33) is adjusted such that the superheating degree SH of discharged refrigerant reaches the predetermined value (within the target range). Specifically, when the superheating degree SH is low, part of refrigerant circulating between the compressor (30) and the evaporator (33) is released to the high-pressure liquid pipe (25) (the refrigerant release operation), thereby decreasing the circulating refrigerant amount to increase the superheating degree SH. This prevents refrigerant from being in the moist state in the compressor (30) (i.e., prevents liquid compression in the compressor (30)). On the other hand, when the superheating degree SH is high, refrigerant of the high-pressure liquid pipe (25) is charged to make up for the deficiency of refrigerant circulating between the compressor (30) and the evaporator (33) (the refrigerant charge operation), thereby increasing the circulating refrigerant amount to decrease the superheating degree SH. This prevents an abnormal increase in outlet temperature of the compressor (30), thereby protecting the compressor (30).

In the foregoing embodiment, the condition where the pressure equivalent saturation temperature HP(T) of high-pressure refrigerant is higher than the outdoor temperature AMBS is added to the conditions for the refrigerant release operation. This prevents a back-flow of refrigerant from the high-pressure liquid pipe (25) in which the condenser (31) is provided, to the hot gas bypass circuit (22). Thus, it can be ensured that the refrigerant release operation is performed, and that the liquid compression in the compressor (30) is prevented.

In the refrigerant release operation, the outside-container fan (35) is operated. Thus, it is encouraged that part of compressed refrigerant released to the condenser (31) is condensed into liquid refrigerant. This allows a large amount of refrigerant to be stored in the condenser (31) or the receiver (41), and therefore it can be ensured that the refrigerant release operation is smoothly performed.

In the refrigerant release operation and the refrigerant charge operation, refrigerant of the receiver (41) circulates through the cooling member (42). This contributes to cooling of the inverter circuit.

Variations of Embodiment

First Variation

In the present variation, the pressure adjusting valve (38) is constantly opened at a predetermined angle (e.g., the minimum angle) in the defrosting mode of the foregoing embodiment. In such a case, while the defrosting mode is performed, part of discharged refrigerant is stored in the receiver (41), and refrigerant of the receiver (41) circulates through the cooling member (42). Thus, it can be ensured that the inverter circuit is cooled. As a result, reliability of the container refrigeration system (10) is further improved.

<Second Variation>

In the present variation, the starting conditions for the defrosting mode of the foregoing embodiment are changed. That is, in the foregoing embodiment, the defrosting mode is started every time the defrosting timer counts up. However, in the present variation, the defrosting mode is started under conditions such as a frost formation state in addition to the foregoing condition. Note that the starting conditions (a precondition and main condition(s)) for the defrosting mode as described below are determined by the controller (80).

Figure 10:
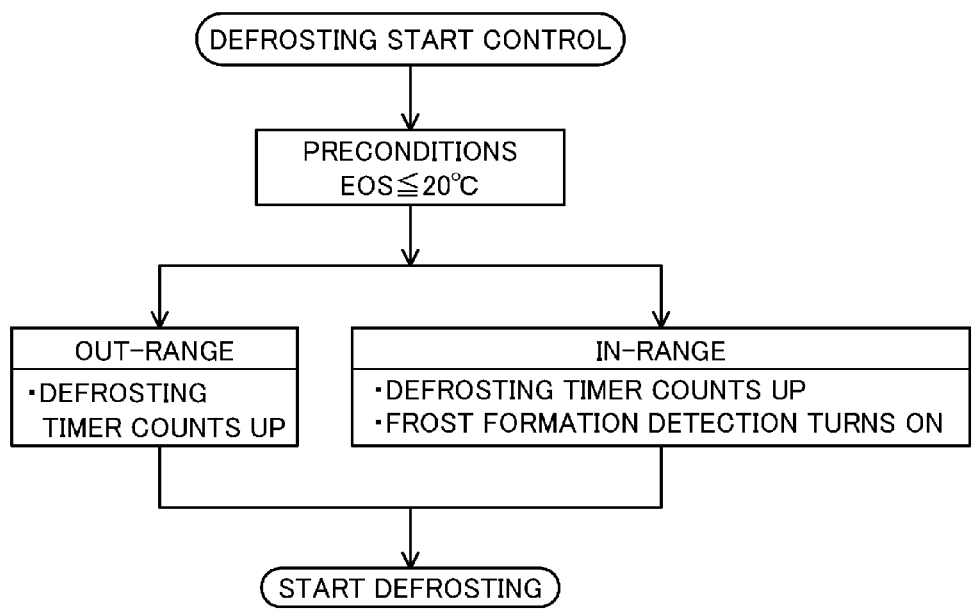
FIG. 10 is a flowchart illustrating starting conditions for a defrosting mode of a second variation of the embodiment.

As illustrated in FIG. 10, in the present variation, it is the precondition for the start of the defrosting mode that the evaporator outlet refrigerant temperature EOS is equal to or lower than a predetermined value (20° C.). If frost is continuously formed on the evaporator (33), refrigerant is less likely to be evaporated, and therefore the evaporator outlet refrigerant temperature EOS is decreased. In the present variation, the decrease in evaporator outlet refrigerant temperature EOS is regarded as the state in which frost is formed on the evaporator (33) or frost is being formed on the evaporator (33). If the precondition is satisfied, it is determined whether or not the main condition(s) is/are satisfied. If the main condition(s) is/are satisfied, the cooling mode is stopped, and then the defrosting mode is started. The main condition is different depending on whether a state in the cooling mode is an "out-range state" or an "in-range state." The "out-range state" indicates the state in which a difference between a temperature inside the container and a set temperature inside the container is equal to or greater than a predetermined value, and the inside of the container is not cooled much. The "in-range state" indicates the state in which the difference between the temperature inside the container and the set temperature inside the container is less than the predetermined value, and the inside of the container is cooled to some extent. In the "out-range state," the main condition is that the defrosting timer counts up. That is, in the "out-range state," the defrosting mode is started after a predetermined time has elapsed from the start of the cooling mode. On the other hand, in the "in-range state," the main conditions are that the defrosting timer counts up and frost formation detection is turned ON. That is, in the "in-range state," the defrosting mode is started after the predetermined time has elapsed from the start of the cooling mode and it is determined that the amount of frost formed on the evaporator (33) is a predetermined amount. The reasons why the different main conditions are set for the "out-range state" and the "in-range state" are as follows. If the state in the cooling mode is the "out-range state" even after the cooling mode is performed to some extent, it is assumed based on such a state that the cooling capacity of the evaporator (33) is not fully used, and that a certain amount of frost is formed on the evaporator (33). Thus, for the "out-range state," only the condition where the defrosting timer counts up is set as the main condition. On the other hand, in the "in-range state," it is assumed that the cooling capacity of the evaporator (33) is properly used, and that not so much frost is formed on the evaporator (33). If only the condition where the defrosting timer counts up is set as the main condition, it is highly likely that the defrosting mode is actually performed in the state in which not so much frost is formed on the evaporator (33). Thus, in the "in-range state," the actual frost formation state of the evaporator (33) is detected to determine the frost amount. This prevents the defrosting mode from being uselessly performed.

Figure 11:
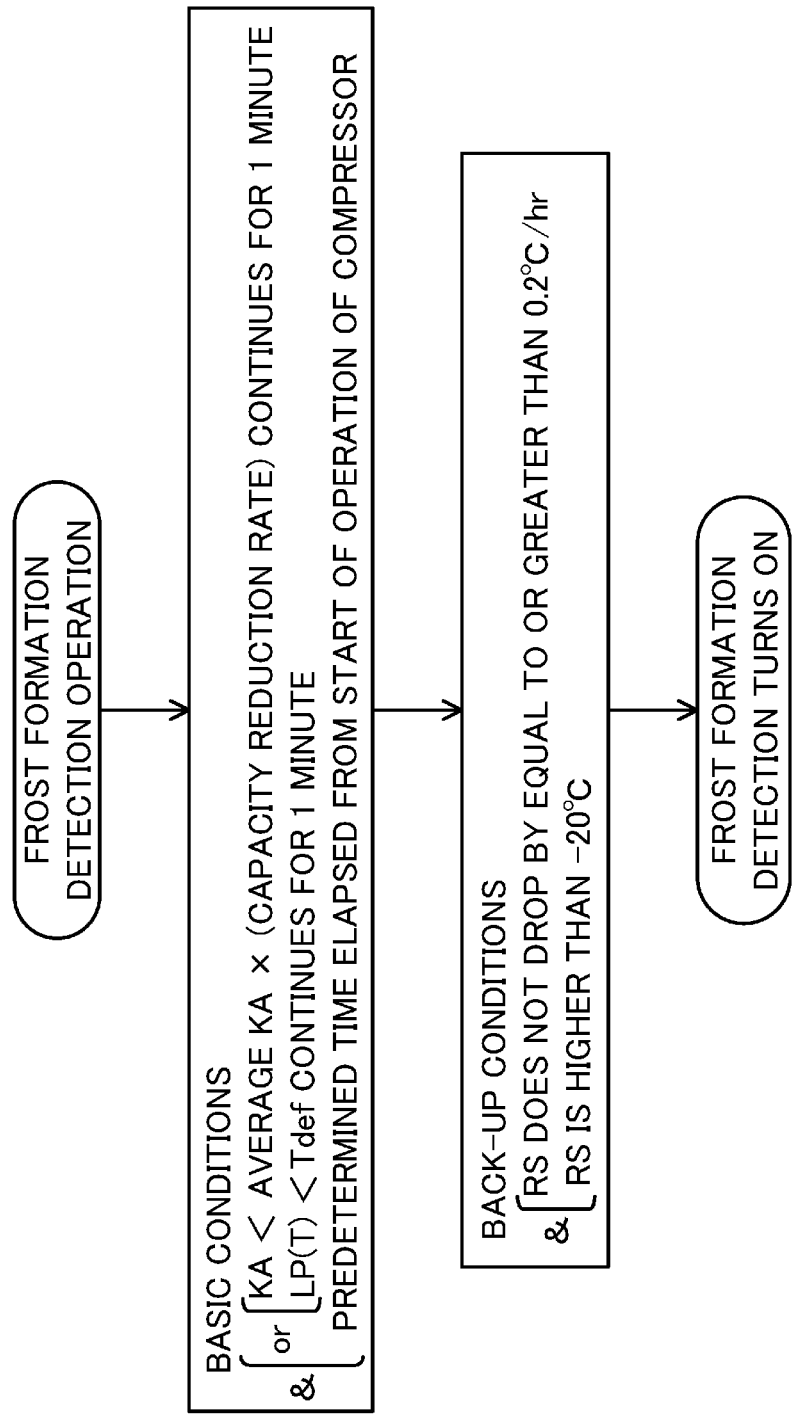
FIG. 11 is a flowchart illustrating a frost formation detection operation of the second variation of the embodiment.

Next, an operation for frost formation detection as described above will be described with reference to FIG. 11. In the operation for frost formation detection, if base conditions and back-up conditions are satisfied, such a state is regarded as the state in which a certain amount of frost is formed on the evaporator (33), and then the "frost formation detection is turned ON." Basically in the operation for frost formation detection, the cooling capacity (hereinafter referred to as a "cooling capacity value KA") of the evaporator (33) which is actually used is calculated, and then the frost formation state of the evaporator (33) is determined based on the cooling capacity value KA. As illustrated in FIG. 11, the basic conditions are as follows: the cooling capacity value KA is lower than a value obtained by multiplying an average cooling capacity value KA by a capacity reduction rate, and such a state continues for a predetermined time (1 minute); or a pressure equivalent saturation temperature LP(T) of refrigerant (low-pressure refrigerant) flowing into the compressor (30) is lower than a value Tdef, and such a state continues for a predetermined time (1 minute). The cooling capacity value KA and the value Tdef are calculated every predetermined time in the cooling mode. The average cooling capacity value KA is an average of a plurality of calculated cooling capacity values KA. The cooling capacity value KA and the value Tdef are calculated respectively using the following first and second equations:

$$KA=Q/((RS+SS)/2-LP(T))\times \text{Coefficient of Flow Quantity} \qquad \text{First Equation}$$

$$Tdef=(RS+SS)/2-\Delta T+B \qquad \text{Second Equation}$$

where "Q" represents a cooling capacity, "RS" represents an inlet air temperature, "SS" represents an outlet air temperature, the coefficient of flow quantity is a coefficient determined by taps (a low speed tap and a high speed tap) of the in-container fan (36), "Tdef" represents a threshold value, "$\Delta T$" represents a coefficient of temperature, and "B" represents a coefficient changed depending on a previous defrosting time. Note that the cooling capacity value KA of the evaporator (33) is unstable right after the cooling mode is started (right after the compressor (30) is operated). Thus, as illustrated in FIG. 11, in order not to calculate the cooling capacity value KA until the cooling capacity value KA of the evaporator (33) is stabilized, it is one of the basic conditions that the predetermined time has elapsed after the start of the cooling mode (after the compressor (30) is operated). The back-up conditions are as follows: the inlet air temperature RS is not decreased by equal to or greater than a predetermined value (0.2° C.) per hour; and the inlet air temperature RS is higher than a predetermined value (−20° C.). The back-up conditions are for checking whether or not the cooling capacity of the evaporator (33) is reduced.

INDUSTRIAL APPLICABILITY

As described above, the present invention is useful as the container refrigeration system configured to cool the inside of the container.

DESCRIPTION OF REFERENCE CHARACTERS

10 Container Refrigeration System
20 Refrigerant Circuit
21 Main Circuit
22 Hot Gas Bypass Circuit
30 Compressor
31 Condenser
32 Main Expansion Valve (Expansion Valve)
33 Evaporator
81 Compressor Control Section
82 Valve Control Section (Refrigerant Amount Control Section)
83 Fan Control Section

The invention claimed is:

1. A container refrigeration system, comprising:
a refrigerant circuit configured to perform a refrigeration cycle and including
a main circuit in which a compressor, a condenser, an expansion valve, and an evaporator are connected together in this order, and
a hot gas bypass circuit in which compressed refrigerant of the compressor is supplied to the evaporator by bypassing the condenser and the expansion valve;
a compressor control section configured to, in a defrosting operation in which the compressed refrigerant of the compressor returns to the compressor through the hot gas bypass circuit and the evaporator and the evaporator is defrosted, control an operating speed of the compressor such that a pressure of the compressed refrigerant of the compressor reaches a target value; and
a refrigerant amount control section configured to, depending on a superheating degree SH of the compressed refrigerant of the compressor in the defrosting operation, perform
a refrigerant discharge operation in which part of the compressed refrigerant of the compressor flows into a high-pressure liquid pipe of the refrigerant circuit in which the condenser is provided, and is stored in the high-pressure liquid pipe, and
a refrigerant supply operation in which the refrigerant of the high-pressure liquid pipe is supplied to the compressor along a path bypassing the evaporator,
wherein in a cooling mode in which refrigerant circulates through the main circuit to perform the refrigeration cycle and an inside of a container is cooled,
when a temperature inside the container is in an out-of-range state, the defrosting operation is started when a predetermined time has elapsed from a start of the cooling mode, the elapsing of the predetermined time being the only condition for starting the defrosting cycle while the temperature inside the container is in the out-of-range state, and
when the temperature inside the container is in an in-range state, the defrosting operation is started after both the predetermined time has elapsed from the start of the cooling mode, and a calculated amount of the evaporator's cooling capacity actually being used is reduced to equal to or less than a predetermined value, wherein the amount of cooling capacity actually being used is calculated based on the cooling capacity of the evaporator, a measured inlet air temperature of the evaporator, a measured outlet air temperature of the evaporator, and a pressure equivalent saturation temperature of refrigerant flowing into the compressor.

2. The container refrigeration system of claim 1, further comprising:
a supercooling heat exchanger provided in the high-pressure liquid pipe; and
a supercooling branch pipe through which refrigerant branched from the high-pressure liquid pipe supercools liquid refrigerant of the high-pressure liquid pipe in the supercooling heat exchanger and then flows into a low pressure gas pipe of the refrigerant circuit or a compression chamber of the compressor in an intermediate pressure state,
wherein, in the refrigerant supply operation, the refrigerant amount control section allows the refrigerant of the high-pressure liquid pipe to flow into the compressor through the supercooling branch pipe.

3. The container refrigeration system of claim 1 or 2, further comprising:
a fan control section configured to, in the refrigerant discharge operation by the refrigerant amount control section, operate a condenser fan of the condenser.

4. The container refrigeration system of claim 1 or 2, wherein
in the defrosting operation, when an outlet refrigerant temperature of the evaporator reaches equal to or higher than a predetermined value, the target value for the pressure of the compressed refrigerant of the compressor is changed to a higher value.

* * * * *